(12) United States Patent
Birklykke et al.

(10) Patent No.: US 11,817,990 B2
(45) Date of Patent: Nov. 14, 2023

(54) SENSITIVE AND ROBUST FRAME SYNCHRONIZATION OF RADIO FREQUENCY SIGNALS

(71) Applicant: Kamstrup A/S, Skanderborg (DK)

(72) Inventors: Alex Birklykke, Skanderborg (DK); Mathias Rønholt Kielgast, Skanderborg (DK)

(73) Assignee: Kamstrup A/S, Skanderborg (DK)

( * ) Notice: Subject to any disclaimer, the term of this patent is extended or adjusted under 35 U.S.C. 154(b) by 23 days.

(21) Appl. No.: 17/613,991

(22) PCT Filed: May 27, 2020

(86) PCT No.: PCT/DK2020/050150
§ 371 (c)(1),
(2) Date: Nov. 24, 2021

(87) PCT Pub. No.: WO2020/239180
PCT Pub. Date: Dec. 3, 2020

(65) Prior Publication Data
US 2022/0224581 A1   Jul. 14, 2022

(30) Foreign Application Priority Data

May 29, 2019 (DK) .......................... PA 2019 70351

(51) Int. Cl.
*H04L 27/26* (2006.01)
*H04L 7/00* (2006.01)

(52) U.S. Cl.
CPC ........ *H04L 27/2656* (2013.01); *H04L 7/0079* (2013.01)

(58) Field of Classification Search
CPC ............. H04L 27/2656; H04L 27/2663; H04L 27/2668; H04L 27/2671; H04L 27/2675;
(Continued)

(56) References Cited

U.S. PATENT DOCUMENTS 4,884,284 A * 11/1989 Nakayama ............. H04B 1/707
375/E1.002
4,943,974 A *  7/1990 Motamedi .......... H04B 1/70753
375/149
(Continued)

FOREIGN PATENT DOCUMENTS

EP   1096454 A2   5/2001
WO   0041521 A2   7/2000

OTHER PUBLICATIONS

Yongzhi Yu; A Novel Time Synchronization for 3GPP LTE Cell Search; 2013 8th International Conference on Communications and Networking in China (CHINACOM); Aug. 14, 2013; pp. 328-331.
(Continued)

*Primary Examiner* — Betsy Deppe
(74) *Attorney, Agent, or Firm* — Renner, Otto, Boisselle & Sklar, LLP

(57) ABSTRACT

A method for detecting a constant envelope burst-mode radio frequency (RF) signal with a known periodic synchronization sequence (PSS) represented therein includes transforming an incoming RF signal into a digital baseband signal (DBS), and processing the phase domain part by: 1) applying a correlation algorithm to correlate the DBS with a synchronization pattern corresponding to the PSS, 2) filtering the resulting correlation signal for removing at least a DC component of the correlation signal, 3) down-sampling the filtered correlation signal with a sampling time controlled by a clock aligned with amplitude peaks in the filtered correlation signal, 4) performing a decision algorithm on the down-sampled signal to determine if PSS is present in the incoming RF signal, then 5) generating an output signal indicating if the known PSS is present in the incoming RF signal, in response to a result of the decision algorithm.

18 Claims, 4 Drawing Sheets

(58) Field of Classification Search
CPC ..... H04L 27/2647; H04L 7/0079; H04L 7/08; H04L 1/06; H04L 1/16; H04W 52/0225; H04W 52/0229
See application file for complete search history.

(56) References Cited

U.S. PATENT DOCUMENTS

| | | | | |
|---|---|---|---|---|
| 6,094,464 | A | 7/2000 | Ebringer et al. | |
| 7,158,541 | B2 * | 1/2007 | Sawada | H04L 27/2605 370/324 |
| 7,577,181 | B2 * | 8/2009 | Cornwall | H04B 1/7156 340/870.02 |
| 8,085,879 | B2 * | 12/2011 | Birkett | H04L 27/22 375/331 |
| 8,446,990 | B2 * | 5/2013 | Liu | H04L 27/2675 375/259 |
| 9,112,515 | B2 * | 8/2015 | Sanderford, Jr. | H04L 27/3845 |
| 9,584,172 | B2 * | 2/2017 | Qiu | H03G 3/3089 |
| 10,425,895 | B2 * | 9/2019 | Murali | H04W 52/0229 |
| 2014/0036779 | A1 | 2/2014 | Yang et al. | |
| 2018/0167194 | A1 | 6/2018 | Fa-Long et al. | |
| 2018/0302183 | A1 | 10/2018 | Liu et al. | |

OTHER PUBLICATIONS

On NB-PSS receiver complexity; 3GPP TSG RAN WG1 NB-Iot Ad-Hoc Meeting #2; Mar. 22-24, 2016.
Faramaz Jabbarvaziri et al.; Low-complexity method for primary synchronisation in the third generation partnership project long term evolution downlink system; IET Communications; The Institution of Engineering and Technology; Jul. 1, 2016; pp. 1229-1235; vol. 10, No. 10.
International Search Report and Written Opinion dated Aug. 31, 2020, for priority International Patent Application No. PCT/DK2020/050150.
Search Report and Search Opinion dated Jan. 10, 2020, for priority DK Patent Application No. PA 2019 70351.

* cited by examiner

SENSITIVE AND ROBUST FRAME SYNCHRONIZATION OF RADIO FREQUENCY SIGNALS

This application is a national phase of International Application No. PCT/DK2020/050150 filed May 27, 2020, which claims priority to Danish Application No. PA 2019 70351 filed May 29, 2019, the entire disclosures of which are hereby incorporated by reference.

FIELD OF THE INVENTION

The present invention relates to the field of radio frequency communication devices and communication methods. Especially, the invention provides a sensitive and robust frame synchronization of radio frequency signals containing data, so as to provide effective reception of data in wireless radio frequency signals, e.g. for utility meter reading applications.

BACKGROUND OF THE INVENTION

Radio communication devices suitable for internet of things (IOT) applications, such as utility meter reading and smart meter management, are required to establish extremely robust long-range wireless connections between the IOT device and an access point, e.g. a collector or concentrator device, arranged for communicating with the IOT device. Utility meters are advanced sensors that measure consumption of utilities such as water, gas, district heating or cooling and electricity. Such radio communication devices often include narrow band communication solutions.

Automatic meter reading (AMR) systems and advanced meter infrastructure (AMI) systems, in the following commonly referred to as meter reading systems, are generally known in the art. Utility companies use such meter reading systems to read and monitor utility meters remotely, typically using radio frequency (RF) communication. AMR and AMI systems increase the efficiency and accuracy of collecting readings and managing customer billing.

Utility meters are often battery-powered, and consequently have a finite amount of energy available for their service cycle. Because of a service cycle for utility meters of typically 10-20 years, it is desirable to reduce cost associated with meter exchange or battery replacement, thus, energy conservation is a major design criterion. Further, the internal frequency reference of a battery-powered utility meter is typically a simple low power quartz crystal resonator, thus it is susceptible to temperature fluctuations causing a varying frequency error and to aging which cause a frequency offset. Thus, transmission of data from the utility meter will change over time with respect to RF carrier frequency.

The combination of limited RF transmission power in the battery-powered utility meters, varying RF transmission properties between transmitter and receiver device, e.g. properties which vary over time, and the mentioned drift of RF transmission frequency cause problems with reliable reception of data from such utility meters.

In low-power wide-area network (LPWAN), the lifetime of battery-driven units/nodes is intimately linked with the efficiency of the RF power amplifier (PA). Due to the low bit rate and long forward-error correction (FEC) coded data frames, the PA is typically active for long durations of time (0.1 to 3 seconds) each time a radio burst is transmitted. Thus, unless the PA is highly effective, lifetime of the individual units is severely diminished. Since PAs have the highest efficiency when operating in full saturation, constant envelope modulations (CEMs) are often used for uplinks in LPWANs. Examples of LPWAN technologies that use CEM are: wireless M-Bus (FSK), LoRa (CSS), NB-IoT Single-Tone Uplink ($\pi$/4-QPSK, $\pi$/2-BPSK), Weightless-P (GMSK), and MIOTY (MSK).

Energy efficient transmission is only achieved if the receiver detects every transmission with a high probability. To this end, the receiver must contain a frame synchronization mechanism that can effectively detect the arrival of the incoming radio bursts. Frame synchronization is typically achieved by matching the received signal with a local copy of a known periodic synchronization sequence PSS, also denoted a preamble (or post- or mid-amble), purposely embedded in radio burst to aid frame synchronization. While any measure of similarity could be used, matching in radio application is typically achieved using a correlation function followed by a decision algorithm or device that indicates whenever the correlation result suggests the presence of the synchronization sequence in the received signal. The canonical example of a decision device is a hard threshold, which indicates that a frame has been detected whenever the correlation result exceeds some predefined threshold value. However, with such simple principle, choosing the optimal threshold value is problematic. If chosen too high, the sensitivity of the frame synchronization is degraded, and if chosen too low, the threshold device will produce many false detections thus overloading the system and preventing the system from detecting actual frames.

In the prior art, the typical approach is to improve upon the threshold decision method, either by proposing methods to choose the right threshold value a-priori, e.g. using Monte Carlo simulations, adaptively, or by post-processing the threshold detector result in order to reduce the false positive count, or combinations hereof. Still, the results can be unreliable in practice, and the solutions become computationally demanding and thus ineffective for implementation e.g. in a relatively simple collector device for AMI or AMR systems.

Adding to the difficulty of the decision problem, is the fact that the correlation results in practical scenarios tend to vary with the strength (amplitude) of the received signal and contain spurious correlations due to coloured noise and interference in reception environment. In many realizations, these problems are intensified further as correlation is performed without prior unit-variance standardization of the input, meaning that the correlation result losses its scale-invariant property. Standardization may be applied, but it is typically omitted as it is computationally demanding, which is unfortunate since the correlation is already computationally demanding in itself.

Object of the Invention

In particular, it may be seen as an object of the present invention to provide a method and a communication device, that solves the above-mentioned problems by providing a sensitive and still reliable reception of RF signals containing data. Especially, it may be seen as an object to provide a reliable reception of RF signals under the conditions of RF signal levels comparable to the noise floor and with a misalignment of RF carrier frequency between transmitter and receiver. Still, it is preferred that a high sensitivity is obtained in combination with a low amount of "false positive" signal detections which will tend to reduce capacity of the receiver device. Still further, it is preferred that the method is computationally effective.

SUMMARY OF THE INVENTION

Thus, the above described object and several other objects are intended to be obtained in a first aspect of the invention by providing a method for detecting a burst-mode radio frequency signal with a known periodic synchronization sequence (PSS) represented therein, the method comprising
receiving an incoming radio frequency (RF) signal by an RF circuit, and generating a digital signal (digital baseband signal), accordingly,
processing the digital signal by means of a processor configured for
1) correlating the digital signal with a synchronization pattern corresponding to the known PSS according to a correlation algorithm to generate a correlation signal,
2) filtering the correlation signal by a filter serving to remove at least a DC component of the correlation signal to generate a filtered correlation signal,
3) down-sampling the filtered correlation signal or the correlation signal with a sampling time controlled by a clock aligned with peaks in the filtered correlation signal or the correlation signal, so as to generate a down-sampled signal accordingly,
4) performing a first decision algorithm on the down-sampled signal to determine if the known PSS is present in the incoming RF signal, and
5) generating an output signal indicating if the known PSS is present in the incoming RF signal, in response to a result of the first decision algorithm.

The advantages of the present invention is that it provides a method that can be used in frame synchronization for constant envelope modulated burst with a known PSS (known as a preamble or post- or mid-amble) which is embedded in a frame also containing data, e.g. consumption data measured by a consumption meter. At the same time, the method minimizes false positive probability, and the detection is immune to variations in signal and noise levels. Thus, the method is advantageous for use in a collector or concentrator device in AMI or AMR applications where weak RF signals needs to be detected in spite of unknown and varying signal and noise levels, unknown arriving time, and reception at an RF carrier frequency which may deviate from the expected.

The present invention is specifically designed to detect a PSS, i.e. synchronization sequences which are periodic. Any time signal x(t) is said to be periodic with period T whenever $x(t)=x(t+T)$ for all times t. The inverse of the period $F_0=1/T$ is known as the fundamental frequency of the signal. In wireless systems, PSSs are widely used as synchronization patterns as they have many desirable properties. They readily yield to analysis, and the repetitive nature simplifies synchronization circuits. For instance, memory requirements are reduced as only a T seconds of the sequence needs to be stored, and FIR filter structures, such as the correlation function, can be folded thus reducing the required number of accumulations and multiplications. As such, all of the above-mentioned LPWAN technologies also incorporate synchronization sequences which are periodic. The most ubiquitous sequence is 0x55555 or 0xAAAAA, i.e. 0101010 . . . . Another example is Barker sequences with alternating polarity. Periodicity of signals is preserved under time-invariant transformation. Thus given any signal x(t) that is periodic with period T, the result after correlation (a non-linear time-invariant function) will also be periodic with T and have the same fundamental frequency 1/T. The present invention exploits this property by introducing a decision algorithm that continuously test whether a periodic component with the same fundamental frequency as the PSS is present in the correlation result. If sufficient evidence is found to support this proposition, the target burst is considered to have arrived.

The method is suitable especially for constant envelope modulation (CEM) signals, e.g. CEM signals based on principles as known in the art, e.g.: wireless M-Bus (FSK), LoRa (CSS), NB-IoT Single-Tone Uplink ($\pi/4$-QPSK, $\pi/2$-BPSK), Weightless-P (GMSK), and MIOTY (MSK).

In contrast to the prior art, the present invention employs an entirely different approach where the decision uses a decision algorithm operating on a filtered version of a correlation signal, i.e. where the DC component has been removed, and where the fundamental frequency has been extracted.

This is based on the insight of the inventors, that it is then possible to use a filtered correlation result as input to a decision algorithm involving a binary hypothesis test, e.g. a maximum a posteriori (MAP) test, to discriminate between RF signals that constitute synchronization sequences and noise. Especially, it has been found that a combination of two decision algorithms in parallel, one algorithm serving to decide about the detection with respect to amplitude in the filtered correlation signal, and one algorithm serving to decide about detection with respect to periodicity in the filtered correlation signal. Especially, two MAP tests can be performed, and their binary results can be combined by a simple AND logic to generate the output signal indicating if the known PSS is present in the incoming RF signal, i.e. a final decision if there is frame synchronization or not. Subsequently, in case of frame synchronization, further processing such as frequency estimation and demodulation of the received frame can be initiated so as to extract data contained in the received frame.

Various correlation algorithms can be used as known in the art, however the inventors have realized that wideband correlation algorithms are advantageous, i.e. types of correlation algorithms which are less influenced by differences in frequency when correlating the incoming signal with the known PSS. Especially, it has been found that the so-called double correlation algorithm is advantageous. An example of the double correlation algorithm can be seen e.g. in "Frame Synchronization in the Presence of Frequency Offset", Z. Y. Choi and Y. H. Lee, IEEE Transactions on Communications, Vol. 50, No. 7, July 2002.

It has been found that the computational complexity of the method is rather limited, since many parts of the processing can be performed with simple elements. Thus, the method can be implemented on a processor with limited capacity, e.g. an FPGA or a simple microprocessor. The invention helps to provide a high capacity for a given processing power available, e.g. a high capacity with respect to RF reception capacity for reading of many meters, in case of the method used in an AMI or AMR collector device.

The RF circuit used to receive incoming RF signals is as known in the art. I.e. an antenna may be connected to an analog circuit and digital parts such as processors, field programmable devices, signal processors, phase locked loops, mixers, power amplifiers and any other element used to receive RF signals. The RF circuit may be a single chip transceiver circuit. The RF circuit may include an analog-to-digital converter serving to generate the digital baseband signal for the further processing.

In the following preferred embodiments and features will be described.

The method preferably comprises removing amplitude information of the digital signal by sample prior to performing step 1), since in CEM signals only the phase component of the signal carries information. This significantly reduces processing complexity in the further processing steps 1)-5). Specifically, the digital baseband signal may be transformed into a phase domain representation prior to performing the subsequent steps 1)-5). The amplitude information may also be removed by performing a normalization procedure, e.g. by applying to each sample a normalization scale calculating for each sample.

Said filter, or an additional separate filter, is preferably a band-pass filter having a pass band around a fundamental frequency of the periodic synchronization sequence. Thus, the filter is preferably a narrow band-pass filter, which serves to ensure that the fundamental frequency of the PSS is the primary component in the resulting filtered signal.

The clock in step 3) may be generated as an output of a peak detector operating on the correlation signal or filtered correlation signal. This is a simple implementation of providing the clock necessary for the down-sampling.

The first decision algorithm may be designed in various ways. Especially, the output of the decision algorithm is binary, i.e. to determine if the PSS is present or not, and thus the generated output signal may be indicative of "detection" or "no detection".

The first decision algorithm may comprise comparing a statistically calculated value in response to the down-sampled signal with a predetermined threshold to determine if the known PSS is present in the incoming radio frequency signal.

The first decision algorithm may comprise performing a statistical hypothesis test to determine if the known periodic synchronization sequence is present in the incoming radio frequency signal, in response to the down-sampled signal. Specifically, the first decision algorithm may comprise performing a maximum a posteriori (MAP) test in response to the down-sampled signal to determine if the known PSS is present in the incoming radio frequency signal.

The correlation algorithm preferably comprises a double correlation algorithm, which has been found to be suitable for providing reliable correlation results also for signals deviating significantly from the expected centre frequency of incoming RF signals.

The method may comprise a combiner arranged to generate the final frame synchronization indicator being an output signal indicating if the known PSS is present in the RF signal, generated as a combination of results of the first and second decision algorithms. E.g. this combination may be a simple logic AND function in case both the first and second decision algorithms are binary decision algorithms. Preferably, such method comprises a periodicity detecting algorithm based on the digital signal, and wherein the second decision algorithm is performed on an output from said periodicity detecting algorithm. Specifically, the periodicity detecting algorithm may be performed on said filtered correlation signal. The periodicity detecting algorithm preferably comprises calculating a jitter signal in response to the digital signal, preferably a jitter signal being a sequence of values indicating a jitter level. Specifically, jitter signal may be derived based on an output of a peak detector, and the jitter values is then calculated as jitter of the peaks output by the peak detector. This allows performing meaningful statistical tests with respect to periodicity. Periodicity can be assumed if jitter value is low, and there is no assumed periodicity if jitter value is high. The second decision algorithm preferably comprises performing a MAP test to determine if the known PSS is present in the incoming RF signal in response to an output from said periodicity detecting algorithm. Preferably, said MAP test is performed in response to a jitter signal determined in response to said filtered correlation signal.

Application of a second decision algorithm which operates on an output from a periodicity detecting algorithm, and combining with the result thereof with the result of the first decision algorithm provides a PSS detection which is both sensitive and also with a very low number of false detections, and this is important for achieving e.g. a sensitive collector device which also has a high capacity.

The method described is specifically useful for further processing to extract data from a data field in the received frame in the burst-mode RF signal in response to the output signal indicating the presence of the periodic synchronization sequence. The further processing preferably comprises a frame synchronization algorithm which serves to uniquely specifies the beginning of the data frame within the received RF burst signal.

The method RF signals may be transmitted with any given carrier frequency. Especially, the carrier frequency may have a nominal frequency being, e.g. within the bands allocated around such as 169 MHz, 450-470 MHz, 860-880 MHz and 902-928 MHz. However, the RF signal may as well be e.g. the 2.4 GHz band.

The method is especially preferred for continuous phase modulation (CPM) type RF signals.

In a second aspect, the invention provides a radio communication device configured to operate according to the method according to the first aspect. In an embodiment, the radio communication device comprises a collector device arranged to receive measured consumption data from a plurality of consumption meters represented in burst-mode RF signals.

Such radio communication device shall be construed as any device including means for RF communication including the necessary hardware and/or software components as known in the art. The digital signal processing steps of the first aspect be implemented by means of hardware, software, firmware or any combination of these. The invention or some of the features thereof can also be implemented as software running on one or more data processors and/or digital signal processors. Especially at least a part of or all of the processing may be implemented in a Field-Programmable Gate Array (FPGA) or an Application Specific Integrated Circuit (ASIC).

The individual elements of an embodiment of the invention may be physically, functionally and logically implemented in any suitable way such as in a single unit, in a plurality of units or as part of separate functional units. The invention may be implemented in a single unit, or be both physically and functionally distributed between different units and processors.

In a third aspect, the invention provides a utility meter reading system comprising
  a radio communication device according to the second aspect, and
  a plurality of consumption meters arranged to measure consumption data for a utility and to generate burst-mode radio frequency signals with the consumption data represented therein. The consumption meters may be arranged for measuring consumption data for one or more of: water, heat, cooling, gas or electricity. The utility meter reading system may comprise a data processor arranged to receive consumption data read by the radio communication device, and to apply further processing, e.g. to provide automatic billing to customers in response to the consumption data.

In a fourth aspect, the invention provides a computer readable program code arranged to perform the processing steps 1)-5) according to the first aspect when executed on a processor. Especially, the program code may be present on a tangible medium, or it may be available for downloading on the internet.

It is to be understood that the same advantages mentioned for the first aspect apply as well for the further aspects, and embodiments mentioned may be mixed for all the mentioned aspects.

BRIEF DESCRIPTION OF THE FIGURES

The invention will now be described in more detail with regard to the accompanying figures. The figures show one way of implementing the present invention and is not to be construed as being limiting to other possible embodiments falling within the scope of the attached claim set.

DETAILED DESCRIPTION OF AN EMBODIMENT

Figure 1:
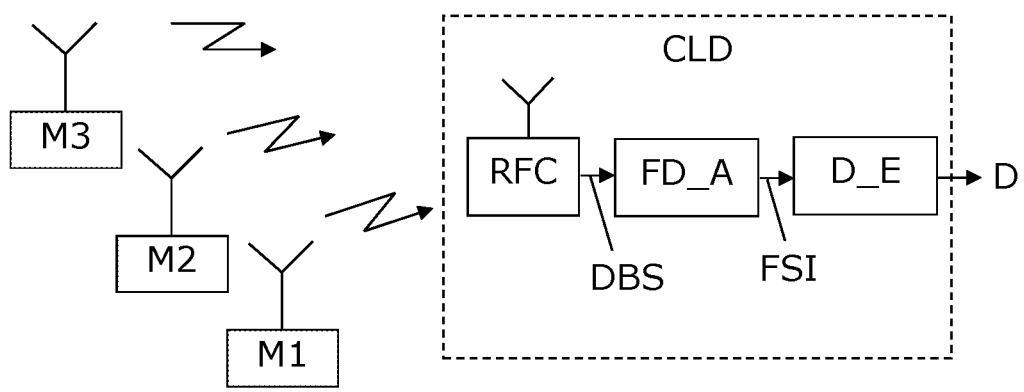
FIG. 1 shows a block diagram of utility meter reading system with a collector device CLD for receiving data from utility meters.

FIG. 1 shows a block diagram of utility meter reading system with a collector device CLD serving to receive data D from utility meters M1, M2, M3. The data are represented in frames in CEM and CPM type burst-mode wireless RF signals with a known prestored PSS also known as pre-, mid- or post-amble. The collector device CLD has an antenna and an RF circuit RFC for receiving incoming RF signals, and generating a digital baseband signal DBS accordingly for further digital processing by a frame detection algorithm FD_A according to the method of the first aspect of the present invention, thus resulting in a frame synchronization indicator output signal FSI which indicates if the PSS is present. In response to this output signal FSI, further processing is performed for extracting data D from the received frame by a data extraction algorithm D_E.

Figure 2:
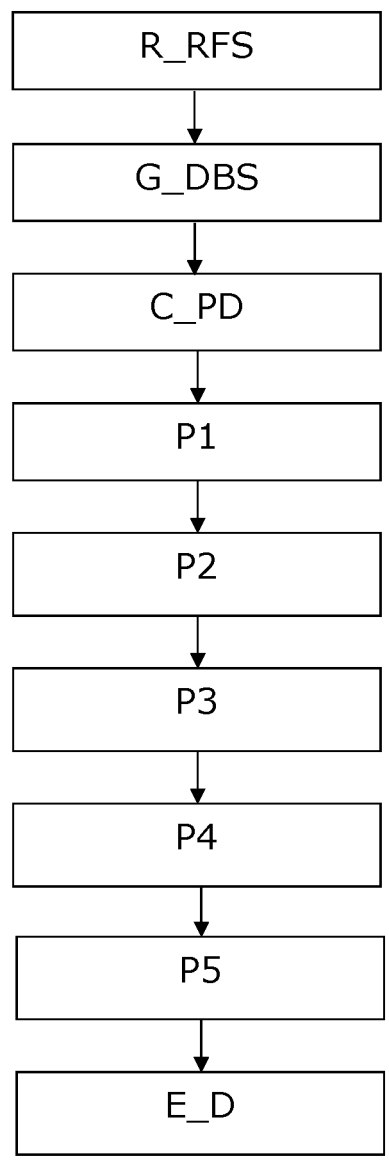
FIG. 2 shows steps of a method embodiment for detecting a constant envelope modulation burst-mode radio frequency signal with a known periodic synchronization sequence represented therein.

FIG. 2 shows steps of a method embodiment for detecting a constant envelope modulation burst-mode radio frequency signal with a known periodic synchronization sequence represented therein. First, step is receiving incoming RF signals R_RFS by a radio frequency circuit, and next generating a digital baseband signal G_DBS accordingly by analog-to-digital conversion of a received analog RF signal. Next, step is removing amplitude information by sample from the digital baseband signal C_PD, e.g. by any type of conversion of the digital baseband signal into a pure phase domain digital signal for further processing by means of a processor. E.g. this step C_PD can be done by providing a normalizing procedure to the digital baseband signal. This step C_PD saves computation complexity in the further processing.

Next, step P1 is correlating the digital signal with a synchronization pattern corresponding to the known periodic synchronization sequence according to a correlation algorithm, preferably involving a double correlation algorithm, to generate a correlation signal. Next, step P2 is filtering the correlation signal by a band-pass filter designed with a narrow pass-band serving to let the fundamental frequency of the PSS to be the primary component in the resulting filtered correlation signal. Next, step P3 is downsampling the filtered correlation signal with a sampling time controlled by a clock in the form of an output of a peak detector operating on the filtered correlation signal (or the correlation signal), thus generating a down-sampled signal accordingly. Next step P4 is performing a first decision algorithm on the down-sampled signal to determine if the known PSS is present in the incoming RF signal. Preferably, the first decision algorithm is arranged to operate on a statistical properties determined in response to the down-sampled signal in order to arrive at decision indicating if an amplitude or energy in the incoming RF signal suggests if the known PSS is present or not. Further, step P5 is generating an output signal indicating if the known PSS is present in the incoming RF signal in response to a result of the first decision algorithm. Finally, step E_D is applying further processing for determining beginning of a received frame, e.g. involving frequency estimation and demodulation, thus allowing extracting data from a data field of the detected incoming frame in the incoming RF signal.

The method is advantageous, since it provides a frame detection or frame synchronization method for CEM burst-mode signals with a known PSS which is both sensitive, minimizes false positive detections, and provides a detection which is immune to variations in signal and noise levels.

Figure 3:
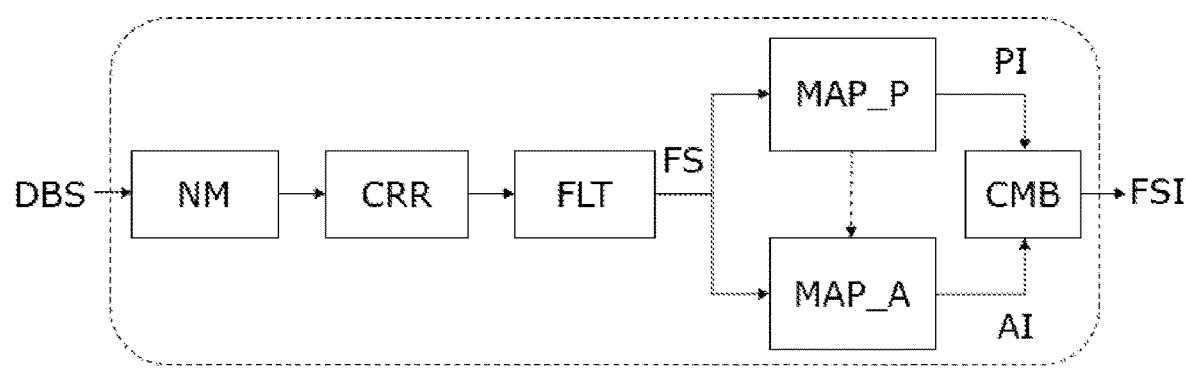
FIG. 3 shows a method embodiment with two decision algorithms combined to arrive at a combined frame synchronization detection decision.

FIG. 3 shows a method embodiment with two decision algorithms MAP_A, MAP_P combined to arrive at a combined frame synchronization indicator FSI. The processing takes as input a digital baseband signal DBS received from an RF circuit with an analog-to-digital converter, e.g. involving a filter. A high performance is achieved by the detection method by normalizing NM the digital baseband signal DBS before applying a correlation algorithm CRR. This provides a correlation output which is invariant to scale of the noise and signal levels. This reduces the number of nuisances factors that must be accounted for in the decision algorithm, thus simplifying the decision problem. Further, a band-pass filter FLT is provided to the output of the correlation algorithm to ensure that ensures that the fundamental frequency of the periodic synchronization sequence is the primary component in the signal FS after filtering, and that a DC component is removed. The filtering FLT removes correlation side-lobes and most of the wideband noise, but leaves the fundamental frequency component of the PSS. Two parallel MAP-based decision logics decision MAP_A, MAP_P with separate decision algorithms serve to detect patterns in the filtered correlation result FS that have the same fundamental frequency as the PSS. Based on the filtered correlation result FS, an amplitude or energy based decision MAP_A is performed, and a periodicity based decision MAP_P is performed. The amplitude decision MAP_A serves to determine if min./max. peaks in the filtered correlation signal FS is different and/or distinguishable from the noise-only case. The periodicity decision MAP_P determines whether any stable periodic component is present in filtered correlation signal FS.

If preferred, it is to be understood that the two decision branches could be completely separate all the way from the digital baseband signal DBS. However, to reduce computations, it is preferred that the processing steps NM, CRR, and FLT are performed in common for the two branches to arrive at the filtered correlation signal FS. The dashed arrow indicates that there can be processing steps, depending on the chosen implementation, in common for the two branches, thus helping to further reduce computational complexity, e.g. an output of a peak detector can be used in both branches.

The two decision algorithms MAP_A and MAP_P result in respective output signals, namely an amplitude indicator AI and a periodicity indicator PI, both being binary signals, i.e. indicating if the decision algorithms determines if the PSS is present in the incoming RF signal or not. The two indicators AI, PI are combined in a combiner CMB, e.g. a simple AND function to arrive at the final frame synchronization indicator FSI. When combined, the test results form a robust indicator for the presence of synchronization sequences in the received signal.

As a further explanation to FIG. 3, the normalization procedure NM removes the amplitude information in the received signal, such that only the information-carrying phase component remain. This approach is only possible for CEM bursts, where information (data, preamble, etc.) is exclusively encoded in the phase of the signal. The only information embedded in the amplitude of the signal, is the received signal strength, which only act as a nuisance parameter in a frame synchronization context.

Mathematically, the received signal may be expressed by $$r[n] = A_r[n]e^{j(\theta_s[n]+\epsilon[n])}$$

where r[n] is the n'th received signal sample, $A_r$ is amplitude of the received sample plus noise, $\theta_s$ is the information carrying phase (potentially containing the synchronization sequence), and $\in$ is a zero-mean phase noise component caused by noise in the received signal. The variance of $\in$ is inversely proportional with the SNR of received synchronization sequence. Thus, for small SNRs the noise component will dominate, and vice versa. The normalization may be implemented in the cartesian/IQ domain by division with the instantaneous amplitude of the received signal $$r_{norm}[n] = \frac{r[n]}{A_r[n]}$$

or by calculating the argument of the complex IQ signal arg(r[n]) and reconstruct the normalized IQ signal as $$r_{norm}[n] = e^{j \cdot arg\, r[n]} = e^{j(\theta_s[n]+\epsilon[n])}$$

Alternatively, it may be chosen not reconstruct the IQ signal and instead only use the argument arg r[n] directly as input to the correlation. Thus performing phase-domain correlation.

Normalization in the present invention is not to be confused with standardization known from statistics where the input is scaled with the inverse of its variance to form a unit-variance input. In the present context, normalization is by sample, i.e. the normalization scale is calculated for each sample. Neither is normalization to be confused with normalization of real valued signals where a signal is forced to lie within the [0, 1] interval.

As a further explanation the correlation algorithm CRR in FIG. 3, this correlation algorithm matches the received signal r[n] with a local copy of the PSS. Correlation is to be understood in a broader sense, and the standard correlation function may in essence be exchanged by any time-invariant similarity measure that produce high values when the received signal and synchronization sequence are similar and vice versa. Examples include, but are not limited to: cosine similarity, double correlator [see e.g. "Frame Synchronization in the Presence of Frequency Offset", Z. Y. Choi and Y. H. Lee, IEEE Transactions on Communications, Vol. 50, No. 7, July 2002], likelihood ratios, and maximum likelihood estimators.

As a further explanation to the filter FLT in FIG. 3, the correlation result is filtered using a filter FLT designed such that the fundamental frequency component of the PSS is the primary component in the signal after filtering. Possible realization include but are not limited to: inverse notch filters, high-pass filters, DC blockers, and bandpass filters.

Figure 4:
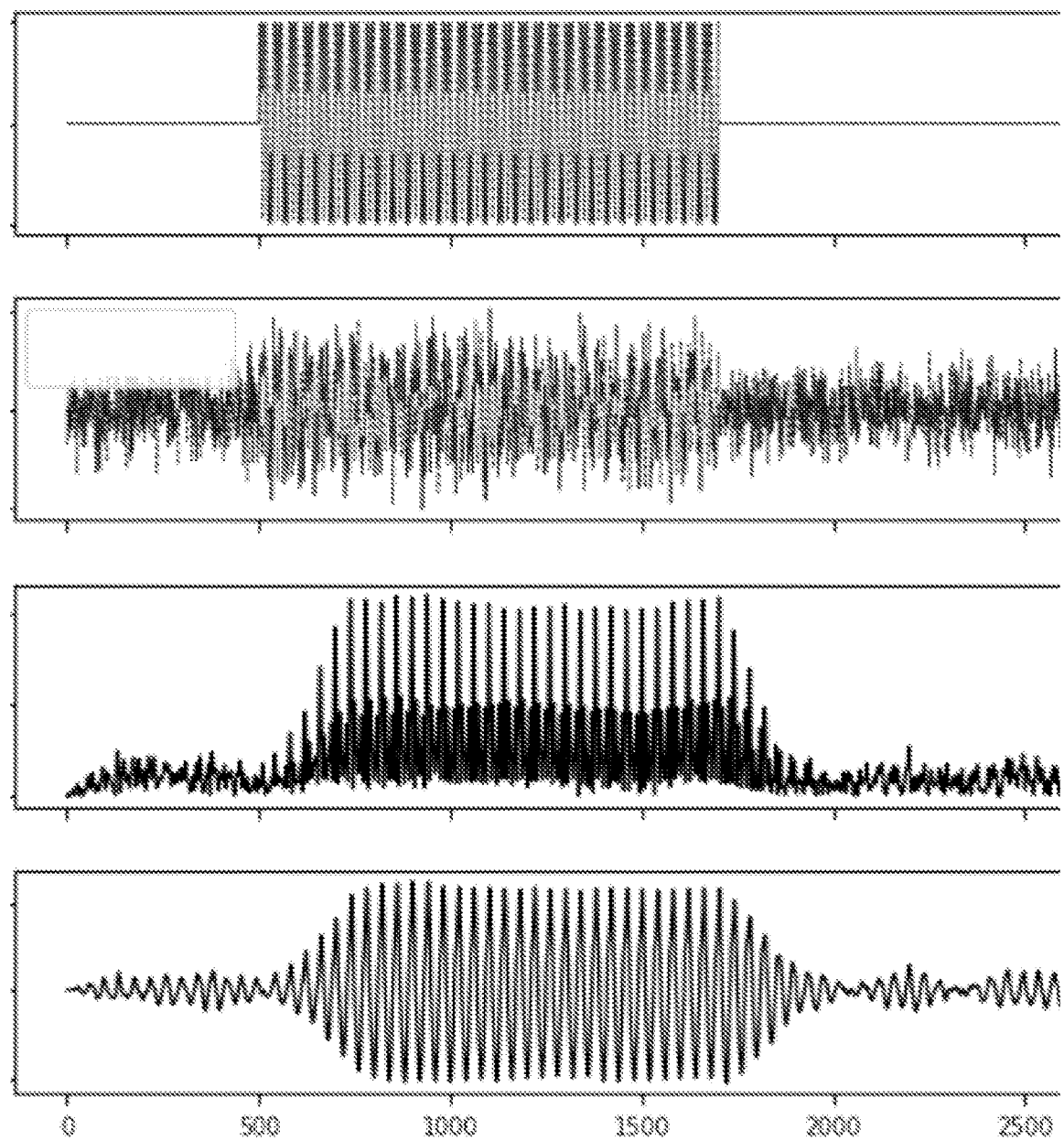
FIG. 4 show examples of signals at various steps of signal processing according to a method embodiment.

FIG. 4 show examples of signals at various steps of signal processing referring to FIG. 3 embodiment. The graphs illustrate signals as sample no. on the horizontal axis and amplitude on the vertical axis. The graphs illustrate the periodic synchronization sequence 01100110 . . . BFSK modulated with modulation index 0.9.

The top graph shows the transmitted waveform, i.e. without any noise. The number two graph from top shows the signal DBS at the RF receiver after fundamental frequency filtering. The number three graph from top shows the signal after normalization NM and correlation CRR, and the lower graph shows the signal FS after filtering FLT.

Figure 5:
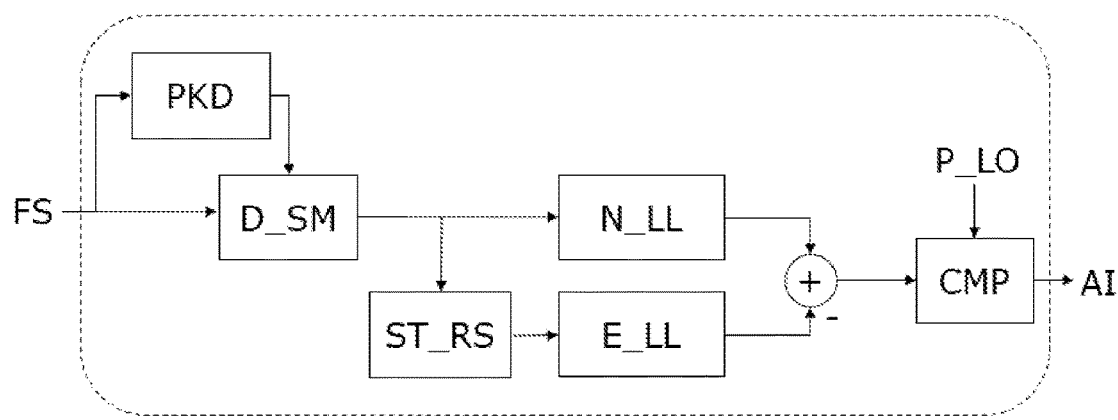
FIG. 5 shows a method embodiment with an amplitude detection algorithm.

FIG. 5 shows a method embodiment with an amplitude or energy detection algorithm, i.e. an example of the processing of MAP_A in FIG. 3. The objective of the amplitude or energy detection test is to determine whether the amplitude (peak values) of the filtered correlation signal FS is distinguishable from noise. The amplitude component of the filtered correlation signals FS is extracted using a peak detector PKD that controls a down-sampling D_SM algorithm. The peak detector PKD indicates whenever the gradient of the input changes either from positive to negative, negative to positive, or both directions. In the present context, a bidirectional peak detector is preferred. The down-sampler D_SM acts as a gate that only passes samples indicated as amplitude peaks by the peak detector PKD. The resulting amplitude signal only contain the peak amplitude values of the filtered correlation result FS.

Figure 6:
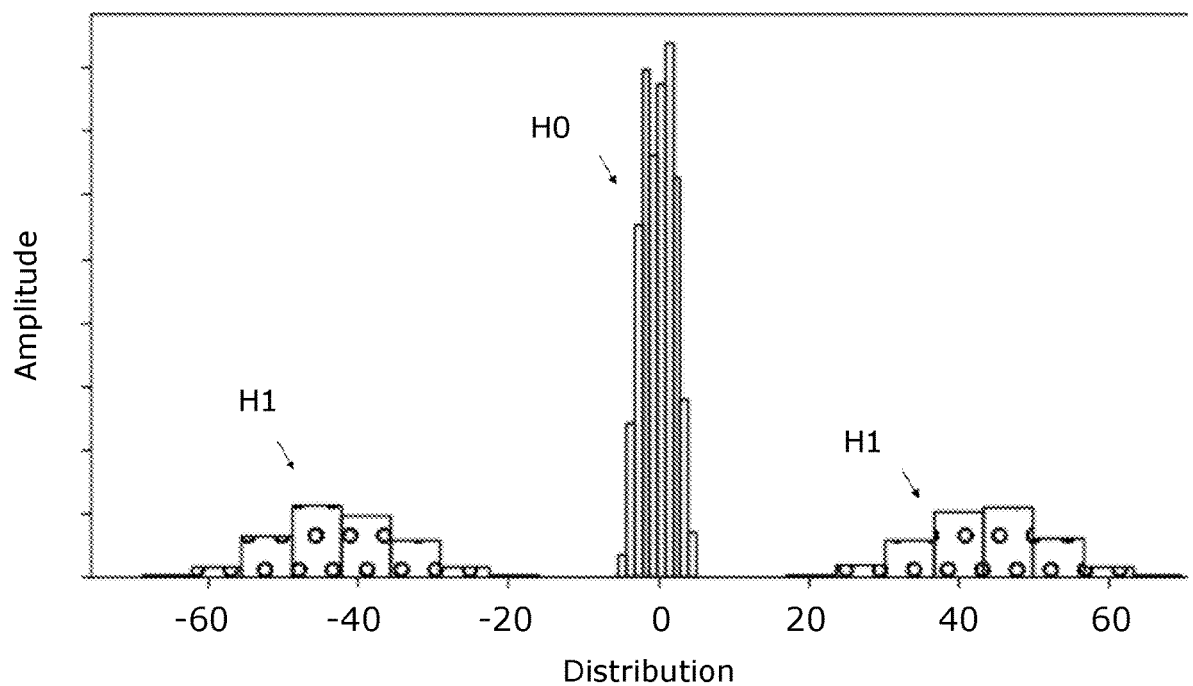
FIG. 6 shows a graph indicating an example of distribution of the values involved in the statistical decision algorithm based on the embodiment of FIG. 5.

Referring to FIG. 6, a histogram illustrates an example of the distribution of the amplitude signal after the down-sampling D_SM. The distribution is shown for the case where a synchronization sequence is present with a signal-to-noise ratio of 8 dB (partly filled bars), and for the case with noise only (narrow white bars). The amplitude signal may be used as input to known decision devices such as threshold detections and post-processing, or as in the present embodiment as input to a MAP test. As shown in FIG. 5, the amplitude signal is used as input to a hypothesis/MAP test that calculates and compares CMP the likelihood of the observed amplitude values given the assumption that the PSS is present (H1 hypothesis) and that the received signal is noise-only (H0 hypothesis), respectively. This involves saturation and reverse scale ST_RS, normal distribution Log-likelihood N_LL, exponential distribution Log-likelihood E_LL as shown in FIG. 5 and to be explained below.

From FIG. 6 it can be seen, that the amplitude observations under H0 are approximately normal distributed with zero mean. Assuming n independent normal distributed observations, where n is the window size of the MAP test, the likelihood function N_LL under H0 is given by $$P(x \mid H_0) = (2\pi\sigma^2)^{-n/2} \exp\left\{-\frac{1}{2\sigma^2} \sum_{m=0}^{n-1} x_m^2\right\}$$

where $\sigma$ is the standard deviation of the signal under H0, and $x_m$ the m'th observation. Under H1, the amplitude observations are bimodal distributed with modes symmetrical around zero. The modes scales with the SNR of the received signal. Hence, in order to model the bimodal distribution, the distribution of the SNR should ideally be included and marginalized away.

In preferred embodiments, a more heuristic approach may be taken, that exploits the symmetry around zero, and use the absolute value of the amplitude observations |x| as basis for the MAP test. Acknowledging that the decision problem is trivial in high SNR cases, the magnitude of |x| is saturated to a limit $x_{lim}$ chosen such that all high-SNR cases map to $x_{lim}$ (i.e. the cases where the decision problem is trivial). The saturated value is given by:

$$f(x) = \min(x_{lim}, |x|)$$

It is expected the probability of s(t) is highest around $x_{lim}$ and taper of towards zero. This behaviour is modelled using the exponential distribution. Assuming n independent observations, where n is the window size of the MAP test, the likelihood function under H1 is given by $$P(x \mid H_1) = \lambda^n \exp\left\{-\lambda \sum_{m=0}^{n-1} x_{lim} - f(x_m)\right\}$$

Preferred embodiments implement the MAP test using the log-transform of the likelihood ratio E_LL. That is $$LO = \log\left(\frac{P(x \mid H_1)}{P(x \mid H_0)}\right) = \log P(x \mid H_1) - \log(x \mid H_0)$$

The log-odds (LO) is then compared CMP with the prior log-odds P_L0 (i.e. the ratio of the prior probability of observation H1 and H0, respectively), to produce an amplitude indicator signal.

Figure 7:
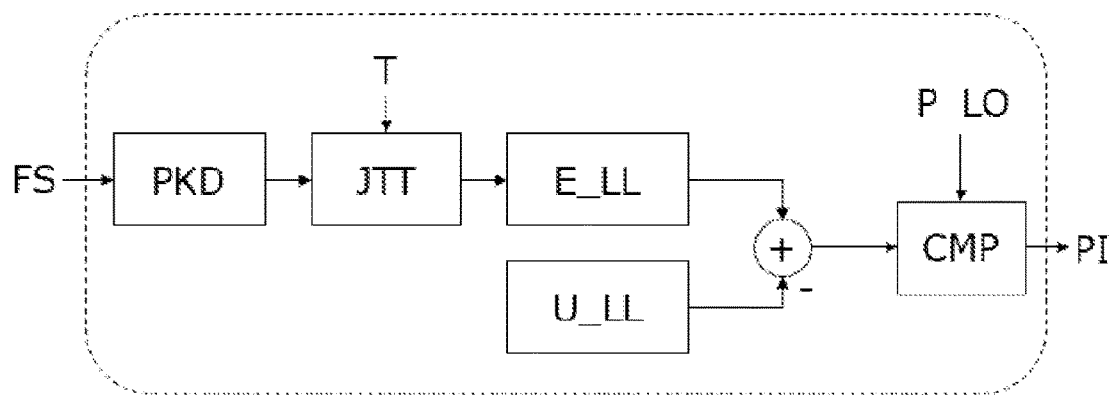
FIG. 7 shows a method embodiment with a periodicity detection algorithm.

FIG. 7 shows a method embodiment with a periodicity detection algorithm, i.e. an example of the processing of MAP_P in FIG. 3. The objective of the test is to determine whether the period of the filtered correlation is consistent over some time period. The period is calculated using a peak detector PKD and jitter calculation circuit JTT. The peak detector PKD indicates whenever the gradient of the input changes from positive to negative or from negative to positive. The jitter calculation circuit JTT measures the distance between peaks and subtracts the period T of the PSS used for synchronization. The jitter value t resulting from the jitter circuit JTT may be used as input to known decision devices such as threshold detections and post-processing, or as in preferred embodiments, as input to a MAP test.

As shown in FIG. 7, the jitter value T is used as input to a MAP test that calculates and compares the likelihood of the observed jitter values given the assumption that the PSS is present (hypothesis H1) and that the received signal is noise-only (hypothesis H0), respectively.

Figure 8:
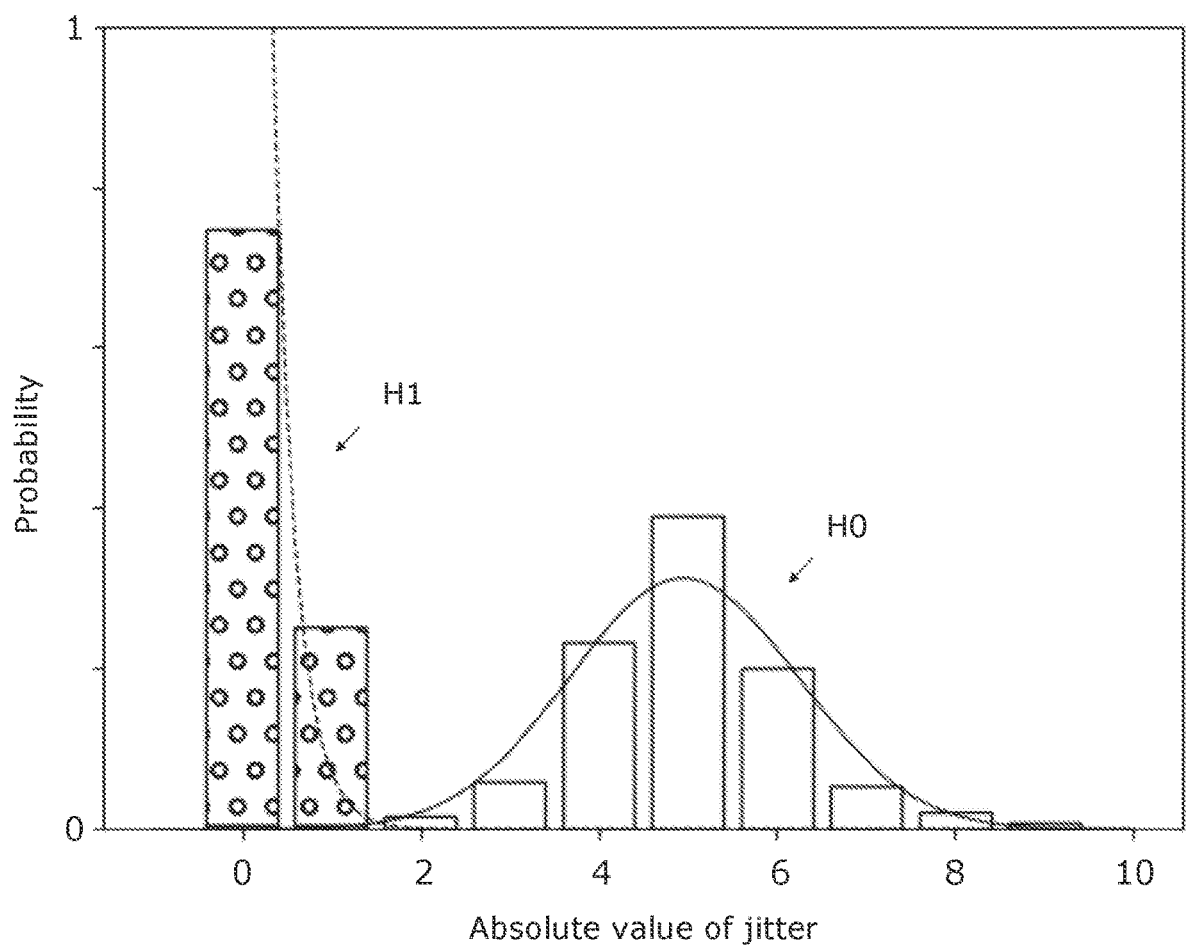
FIG. 8 shows a graph indicating an example of statistical values involved in the statistical decision algorithm based on the embodiment of FIG. 7.

Empirically, it has been found, see FIG. 8, that the jitter observations under H1 are approximately exponentially distributed E_LL. FIG. 8 shows histograms (absolute value of jitter in samples on the horizontal axis and probability on the vertical axis), showing the distribution of the jitter without signal, i.e. noise only (white bars) and with signal present with a signal-to-noise ratio of 8 dB (partly filled bars). The plot also shows an exponential (dashed line) and normal distribution fitted (solid line) to the histograms.

Assuming n independent observations, where n is the window size of the MAP test, the likelihood function under H1 is given by $$P(\tau \mid H_1) = \lambda^n \exp\left\{-\lambda \sum_{m=0}^{n-1} \tau_m\right\}$$

where $\lambda$ is the rate/shape parameter and $\tau_m$ the m'th observation in a series.

Likewise, under H0 (noise-only) the jitter observations will be approximately normal distributed with a mean value of L/2. The current embodiment approximates the normal distribution using the uniform distribution U_LL, to simplify implementation. Other distributions might also work. In this case the likelihood function L reduces to $$P(\tau \mid H_1) = \left(\frac{1}{L}\right)^n$$

The invention implements the MAP test using the log-transform of the likelihood ratio. That is $$LO = \log\left(\frac{P(\tau \mid H_1)}{P(\tau \mid H_0)}\right) = \log P(\tau \mid H_1) - \log(\tau \mid H_0)$$

The log-odds (L0) is then compared CMP with the prior log-odds P_L0 (i.e. the ratio of the prior probability of observation H1 and H0, respectively).

The particular choice of distributions for H0 and H1 above only serve as prudent examples. In general any combination of continuous probability distributions may be used as basis for H0 and H1 in both the first and second decision algorithm.

Furthermore, it is to be understood that the parameterization of the distribution ($\sigma$, $\lambda$ and $x_{lim}$ in the above) may be static or dynamic, or a combination hereof. If static, the parameter is chosen by the designer and is independent on the output of the correlation algorithm. If dynamic, a parameter is derived during runtime from the output of the correlation algorithm, or a suitable transform hereof, thus continuously adapting to the statistical properties of the incoming RF signal.

The method and devices of the invention can be applied in many different applications where sensitive RF signal detection is required. However, one preferred application is in AMI or AMR systems. In such systems, the utility meter may be any kind of utility meter, e.g. a battery-operated utility meter, utility sensor or environmental sensor being part of a utility network especially utility meters used in connection with district heating, district cooling and/or distributed water supply. Common battery-operated utility meters are water meters for cold and/or hot water, heat meters for district heating, cooling meters, gas meters, energy meters or smart meter. The utility meter may be a legal meter, i.e. a meter which is subdued to regulatory demands. Such regulatory demands may be demands to the precision of the measurements. Common utility sensors used by utilities are pressure sensors, temperature sensors, acoustic sensors, flow sensors, chemical sensors. The utility meter comprises one or more transducers and transducer circuits for measuring an amount of delivered utility. The transducers may be a flow transducer, a temperature transducer, pressure transducers, acoustic transducers, turbidity transducers or transducers arranged to measure chemical substances in the utility. Especially the flow transducer may be arranged to measure a flow rate of a fluid flowing in a flow channel by use of the known operation principle for transit time flow meters, where ultrasonic signals are emitted at one transducer and received at the other transducer, and where the difference in time-of-arrival between oppositely propagating signals is measured and converted into a flow rate.

To sum up, the invention provides a method for detecting a burst-mode radio frequency (RF) signal with a known periodic synchronization sequence (PSS) represented therein, e.g. to be for reading of data from utility meters. An incoming RF signal is transformed into a digital baseband signal (DBS), and processed by: 1) applying a correlation algorithm to correlate the DBS with a synchronization pattern corresponding to the PSS. 2) filtering the resulting correlation signal for removing at least a DC component of the correlation signal. 3) down-sampling the filtered correlation signal (or the correlation signal) with a sampling time controlled by a clock aligned with amplitude peaks in the filtered correlation signal (or the correlation signal). 4) performing a decision algorithm on the down-sampled signal to determine if PSS is present in the incoming RF signal. Then, 5) generating an output signal indicating if the known PSS is present in the incoming RF signal, in response to a result of the decision algorithm. The steps 1)-5) serve to detect if an amplitude in the correlation signal indicates the presence of the known PSS. Preferably, a second decision algorithm serves to detect if periodicity in the correlation signal indicates the presence of the known PSS, and finally the results of the first and second decision algorithms can be combined, e.g. by a logic AND operation, to arrive at a sensitive and reliable PSS detection result.

Although the present invention has been described in connection with the specified embodiments, it should not be construed as being in any way limited to the presented examples. The scope of the present invention is to be interpreted in the light of the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A method for detecting a burst-mode radio frequency signal with a known periodic synchronization sequence represented therein, the method comprising
   receiving an incoming radio frequency signal by a radio frequency circuit, and generating a digital signal accordingly, and
   processing the digital signal by means of a processor configured for
   1) correlating the digital signal with a synchronization pattern corresponding to the known periodic synchronization sequence according to a correlation algorithm to generate a correlation signal,
   2) filtering the correlation signal by a filter serving to remove at least a DC component of the correlation signal to generate a filtered correlation signal,
   3) down-sampling the filtered correlation signal or the correlation signal with a sampling time controlled by a clock aligned with peaks in the filtered correlation signal or the correlation signal, respectively, so as to generate a down-sampled signal accordingly,
   4) performing a first decision algorithm on the down-sampled signal to determine if the known periodic synchronization sequence is present in the incoming radio frequency signal, and
   5) generating an output signal indicating if the known periodic synchronization sequence is present in the incoming radio frequency signal in response to a result of the first decision algorithm.

2. The method according to claim 1, comprising removing amplitude information of the digital signal prior to the processing step.

3. The method according to claim 1, wherein said filter is a band-pass filter having a pass band around a fundamental frequency of the known periodic synchronization sequence.

4. The method according to claim 1, comprising limiting a frequency range prior to converting the radio frequency signal into the digital signal.

5. The method according to claim 1, comprising generating said clock in step 3) as an output of a peak detector operating on the correlation signal or filtered correlation signal.

6. The method according to claim 1, wherein performing said first decision algorithm comprises comparing a statistically calculated value in response to the down-sampled signal with a predetermined threshold to determine if the known periodic synchronization sequence is present in the incoming radio frequency signal.

7. The method according to claim 1, wherein performing said first decision algorithm comprises performing a statistical hypothesis test to determine if the known periodic synchronization sequence is present in the incoming radio frequency signal, in response to the down-sampled signal.

8. The method according to claim 7, wherein performing said statistical hypothesis test comprises performing a maximum a posteriori test in response to the down-sampled signal to determine if the known periodic synchronization sequence is present in the incoming radio frequency signal.

9. The method according to claim 8, wherein the first decision algorithm employs a probability distribution as basis for statistical hypothesis testing.

10. The method according to claim 9, wherein the probability distribution is parameterized, and the parameterization is static or derived dynamically based on the correlation signal, or a combination of static and dynamically derived parameters.

11. The method according to claim 1, wherein the correlation algorithm comprises a double correlation algorithm.

12. The method according to claim 1, wherein the processing step comprises performing a second decision algorithm to determine if the known periodic synchronization sequence is present in the incoming radio frequency signal, wherein said step of generating the output signal indicating if the known periodic synchronization sequence is present in the incoming radio frequency signal is performed in response to a combination of results of the first and second decision algorithms.

13. The method according to claim 12, wherein the processing step comprises performing a periodicity detecting algorithm based on the digital signal, and wherein the second decision algorithm is performed on an output from said periodicity detecting algorithm.

14. The method according to claim 13, wherein performing said second decision algorithm comprises performing a maximum a posteriori test to determine if the known periodic synchronization sequence is present in the incoming radio frequency signal in response to an output from said periodicity detecting algorithm, and wherein said maximum a posteriori test to determine if the known periodic synchronization sequence is present in the incoming radio frequency signal is performed in response to a jitter signal determined in response to said filtered correlation signal.

15. The method according to claim 12, wherein the second decision algorithm employs a probability distribution as basis for statistical hypothesis testing.

16. The method according to claim 1, wherein the burst-mode radio frequency signal comprises a Constant Envelope Modulation burst-mode signal.

17. A radio communication device comprising RF communication hardware and software configured to operate according to the method according to claim 1.

18. A utility meter reading system comprising
the radio communication device according to claim 17, and
a plurality of consumption meters arranged to measure consumption data for a utility and to generate burst-mode radio frequency signals with the consumption data represented therein.

* * * * *